XR 3,727,030

United State
McMurtry

[11] 3,727,030
[45] Apr. 10, 1973

CROSS REFERENCE SEARCH ROOM

SUBSTITUTE FOR MISSING XR

[54] HAND PROBE FOR MANUALLY OPERATED OPTICAL SCANNING SYSTEM

[75] Inventor: David Harwood McMurtry, Portola Valley, Calif.

[73] Assignee: International Business Machines Corporation, Armonk, N.Y.

[22] Filed: June 30, 1971

[21] Appl. No.: 158,466

[52] U.S. Cl. ........................235/61.11 E, 250/219 Q
[51] Int. Cl............................G06k 7/10, E04g 17/00
[58] Field of Search................235/61.11 E, 61.11 R; 250/219 Q, 219 D, 219 DC

[56] References Cited

UNITED STATES PATENTS

| | | | |
|---|---|---|---|
| 3,474,234 | 10/1969 | Rieger et al. | 235/61.11 E |
| 3,413,447 | 11/1968 | La Mers | 235/61.11 E |
| 3,518,440 | 6/1970 | Hanson et al. | 235/61.11 E |
| 3,533,657 | 10/1970 | Da Silva | 235/61.11 E |
| 3,585,367 | 6/1971 | Humbarger | 235/61.11 E |
| 3,576,430 | 4/1971 | Fickenscher | 235/61.11 E |

*Primary Examiner*—Daryl W. Cook
*Attorney*—George E. Roush

[57] ABSTRACT

A low-cost hand held probe for scanning retrospective pulse modulation bar coding documents of high density comprises a bundle of many discrete optical image fibers which is optically divided into a pair of light carrying conduits by means of an aperture plate having two contiguous apertures therein. One aperture transmits light from a source of illumination down one optical conduit to a paper document. The light emanating from the document end of the bundle travels horizontally through the fibers of the paper to the optical fibers forming the other optical conduit. This light is transmitted up through the bundle to a photosensitive device coupled to circuitry for determining the degree of reflected light. The optical bundle is preferably tapered and is drawn in a unit which eliminates critical alignment problems and reduces the number of operations for manufacture. The apertures are parts of a circle whereby orientation of the probe is virtually unnecessary in most applications. Where orientation is desired, the tip is faced at an angle normal to and at an angle away from normal to the longitudinal axis of the probe in one alternate embodiment and the fiber optic bundle is bent in another alternate arrangement. These structures assist the operator in orienting the light apertures with respect to the document being scanned.

13 Claims, 10 Drawing Figures

INVENTOR.
DAVID H. McMURTRY

BY George E. Roush
ATTORNEY

HAND PROBE FOR MANUALLY OPERATED OPTICAL SCANNING SYSTEM

The invention relates to optical scanning systems, and it particularly pertains to hand held probes for such systems, especially for scanning documents having in indicia thereon in the form of closely spaced parallel lines.

Hand held optical scanning systems of the type hereinafter disclosed are old in general as is reflected in the following U.S. patents:

| | | | |
|---|---|---|---|
| 2,420,716 | 5/1947 | Morton et al. | 250-41.5 |
| 3,229,075 | 1/1960 | Palti | 235-61.11 |
| 3,278,754 | 11/1966 | Wallace | 250-223 |
| 3,327,584 | 6/1967 | Kissinger | 88-14 |
| 3,359,405 | 12/1967 | Sundblad | 235-61.11 |
| 3,417,234 | 12/1968 | Sundblad | 235-61.11 |
| 3,509,353 | 4/1970 | Sundblad et al. | 250-227 |

and the following article in the technical literature: M. Sokolski, "Improved Fiber Optic Read Head," IBM Technical Disclosure Bulletin, Vol. 8, No. 11, April 1966, page 1580.

These prior art arrangements serve well for the purposes intended. However, they are expensive to manufacture, incapable of providing the higher contrast over shorter span of scan needed and too unwieldy for present day applications. In such applications little or no training is given the operator in obtaining reliable data for application to an electronic data processing system which preferably is coupled to many such inputs almost continually during a normal working day.

The objects indirectly referred to hereinbefore and those that will appear as the specification progresses are attained in a hand held probe of simple construction. A single coherent optical fiber bundle, preferably tapered, has one end arranged for direct contact with the document to be scanned. At the other end an aperture stop plate is fitted across the optical fiber conduit. This aperture plate has two apertures therein with one side of each aperture contiguous to a corresponding side of the other aperture. In other words, a circular, oval, or rectangular area is defined by two apertures (in the various outer configurations listed) divided by a centrally located bar into substantially equal parts. The width of the bar preferably is of the order of three times the maximum diameter of the optical fibers at the end of the conduit at which the aperture plate is positioned. In this manner light is transmitted through the optical fiber bundle in two smaller parallel conduit sections of optical fibers separated by a narrow elongated area approximately three fiber diameters wide. Light from a suitable source of illumination is directed onto one aperture for transmitting light down to the document. Light from the one aperture passes from the illuminating conduit of optical fibers substantially horizontally through the fibers on the document to the adjacent optical fibers. The other optical conduit in turn transmits the reflected light up the adjacent fibers forming the other conduit defined by the other aperture to a photosensitive device which is arranged thereby. Electronic circuitry connected to the photosensitive device is arranged for reducing the data determined by scanning for application to the data processing system.

With a pair of apertures having a circular envelope according to the invention orientation of the probe is unnecessary where the diameter of the circle at the tip of the probe is of the order of the width of the narrowest line or space of the printing on the document being scanned. For scanning with elongated apertures at the probe tip it is necessary that the longer dimensions be normal to the direction of scan. Normally the tip of the probe is faced perpendicular to the longitudinal axis of the probe. To aid in orienting the probe, the tip may be faced at an angle off normal so that orientation is established by leading the pen in the plane of the smallest angle the face of the tip makes with the longitudinal axis of the probe. Alternately the tip of the probe is curved during drawing and faced perpendicular to the axis of the fibers for better translation of light, and the probe led in the direction of the plane with the smallest angle as before.

In order that full advantage of the invention may be obtained in practice, preferred embodiments thereof, given by way of example only, are described in detail hereinafter with reference to the accompanying drawing, forming a part of the specification, and in which.

Figure 5B:
Figure 5A:
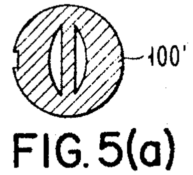
Figure 3B:
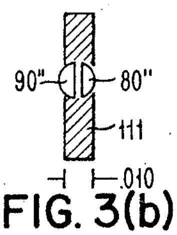
Figure 3A:
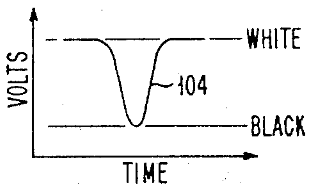
Figure 3D:
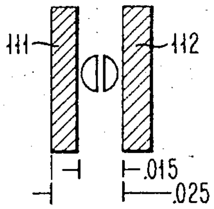
Figure 3C:
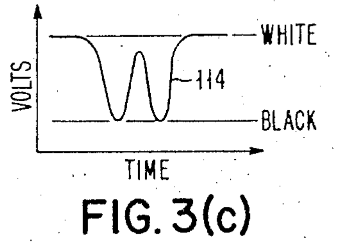
Figure 4:
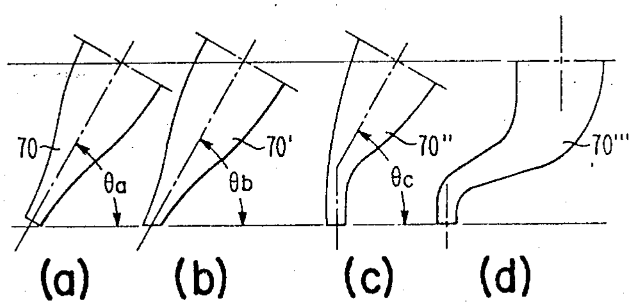

FIGS. 3(a), 3(b), 3(c) and 3(d) illustrate waveforms obtained under particular conditions in the operation of a probe according to the invention;

FIG. 4 is a single diagram graphically comparing a number of probe tips in elevation views according to the invention; and FIG. 5(a) is a plan view of an alternate aperture plate, and FIG. 5(b) is a bottom view of an alternate tip of a probe according to the invention.

Figure 1:
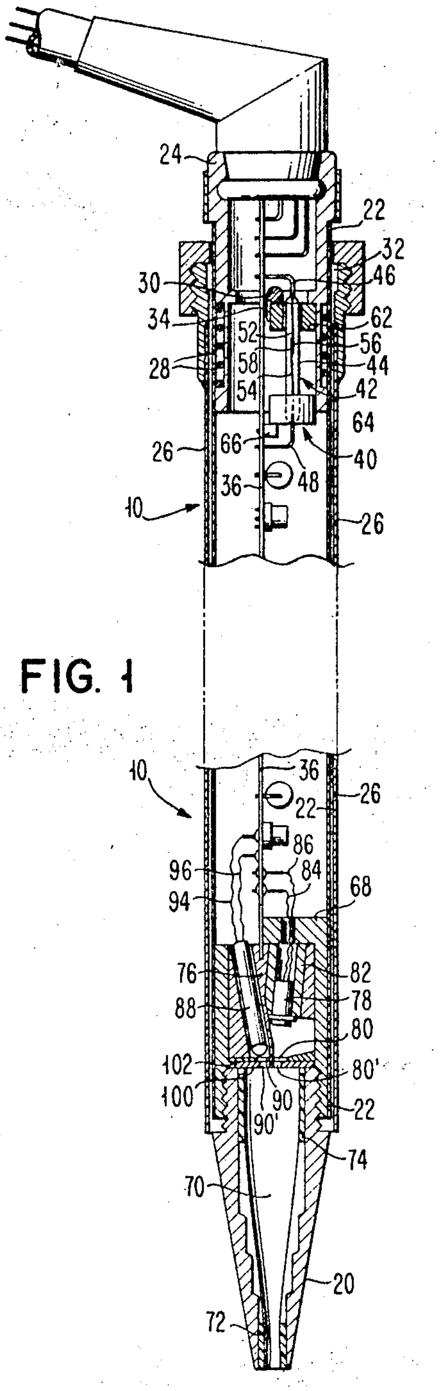
FIG. 1 is a cross section view of a hand held probe according to the invention.

A preferred embodiment of an optical scanning assembly according to the invention is shown in FIG. 1. A hand held probe 10 is touched to the document to be scanned. In this system, as in many such systems, it is desirable that a switch be closed when the probe 10 is touched to a document to be scanned. The probe 10 comprises a nose piece 20 which is fitted into a cylindrical barrel 22. The upper end of the barrel 22 has an end fitting 24 arranged therein. Arranged about the barrel 22 is a tubular sleeve 26 which is grasped by the hand of the operator using the probe. A spring 28 arranged in the end fitting 24 has one end pressing between the barrel 22 by way of the end fitting 24 and a switch actuating pin 30 shown in cross-section. The latter confined in an annular groove 32 surrounding the barrel 22 and passes through a slot 34 and another slot (not shown) diametrically opposite to the first slot 34 in the barrel. The upper end of which forms part of the groove 32 and permits assembly and dismantling of the barrel 22, sleeve 26, and pin 30. The upper end of the slot 34 determines the normal relationship of the barrel 22 and the sleeve 26. The slot 34 also confines the movement of the pin 30 to vertical movement; while the sleeve 26 is allowed full freedom to rotate about the barrel 24. A circuit board 36 of conventional form is arranged in the barrel 24 to one side of the slot 34 and fixed at one end to the upper end fitting 24. An electric switch assembly 40 such as that shown and described in the copending U. S. Pat. application Ser. No. 158,754 of Joseph Emanual Shepard filed on the 1st day of July, 1971, and thereafter issued on the 1st day of August, 1972, as U. S. Pat. No. 3,681,724 is arranged in operating relationship to the pin 30. When the operator, using the probe 10, presses the nose piece 20 against the document to be scanned, the motion of the sleeve 26 forces the switch actuating pin 30 downward relatively in the slot 34. This relative movement is used to actuate the electric switch assembly 40.

The electric switch assembly 40 comprises a magnetic reed switch capsule 42. The capsule 42 comprises a glass envelope 44 with a pair of electric leads 46, 48 in the walls. These electric leads 46, 48 are integral with a pair of magnetic reed elements 52, 54 having electric contacts 56, 58 centrally of the envelope 44. A pair of tubular magnets 62, 64 are slidably arranged about the envelope 44. The annular faces at the ends of the magnets, are oppossing poles. The magnets 62 and 64 repel each other so that in the unactuated position the magnets 62, 64 are urged against the switch actuating pin 30 and the stop 66 respectively. Alternately, the magnet 64 may be glued in place on the envelope 44. In either case, the envelope 44 and the magnet 64 are arranged for the proper coaction of the magnets 62, 64 and the reeds 52, 54. When the pin 30 is moved relatively downward the magnet 62 travels to the center of the envelope 44 and the magnetic field thus moved downward causes the magnetic reeds 52, 54 to bring the contacts 56, 58 together completing the electric circuit and indicating that the probe 10 is operative.

A lower end fitting 68 having a cylindrical periphery arranged in the barrel 22 at the lower end of the probe. The circuit board 36 is affixed to the upper end of the lower end fitting 68. The nose piece 20 is threaded at the upper end to screw into matching threads in the lower end fitting 68. An optical fiber conduit 70 is arranged in the nose piece 20 and spaced therefrom by means of two plastic shock mounting collars 72 at lower bottom and 74 at upper end of the nose piece. A cylindrical spacing member 76 is arranged in the end fitting 68. The assembly preferably is held snugly together by screwing the nose piece 20 until the barrel 22 is in compression and the circuit board 36 is in tension. With such an arrangement the circuit board is notched or otherwise shaped to fit loosely in the end fittings 24, 68 until tension is effected. Alternately, the end fittings may be sweated to the barrel and the spacing member 76 is brought snugly to the larger end of the conduit 70 bears firmly against the lower end of the spacing member 76 or against an apertured plate 100 as shown.

The spacing member 76 is bored to accommodate a light source shown here in the form of a light emitting diode 78. An aperture 80 is arranged in the lower end of the spacing member 68 for passing light from the diode 78 into the conduit 70. A sleeve 82 is used to fasten the diode 78 in the bore and electric leads 84 and 86 are brought to terminals on the circuit board 36. The end of the spacing member 76 preferably is slotted so that the circuit board 36 is used to orient the member 76 in the probe. The spacing member 76 is also bored to accommodate a photosensitive device 88 and another aperture 90 is cut into the bottom of the member 76 for admitting light from the conduit 70 to the photosensitive device 88. Electric leads 94 and 96 lead from the photosensitive device 88 to terminals on the circuit board 36 for connection to the circuitry thereat. As shown the apertures 80 and 90 are given at least the desired configuration to be described hereinafter. Preferably, however, apertures 80 and 90 are relatively larger than required and apertures 80' and 90' of the desired size and configuration are made in an aperture plate 100. In this manner aperture stops of different size and/or shape are exchangeable in the same probe for different applications. An orienting lug 102 may be provided for the purpose of aligning the aperture plate 100 which for this purpose will have a suitable notch therein.

Figure 2B:
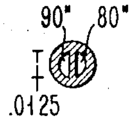
FIG. 2(a) is a plan view of the aperture plate and FIG. 2(b) is an end view of the probe tip illustrating virtual apertures corresponding to the actual apertures in the plate.
Figure 2A:
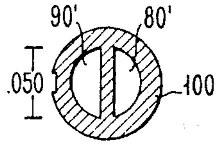

A plan view of the aperture stop plate 100 is shown in FIG. 2(a). Apertures 80' and 90' as shown are portions of a full circle divided by a diametrically extending portion which is of the order of three times the diameter of the several optical fibers making up the conduit 70. The individual fibers have a nominal diameter of the order of 0.0005 inch. The apertures 80' and 90' are part of a circle which in practice is about 0.050 inches in diameter. The optical conduit 70 is made of a number of fibers drawn to reduce size considerably. The bundle 70 of optical fibers is operable according to the invention as made with a substantially uniform cross-section of 0.25 inch. In most applications, however, the bundle 70 is tapered in the final draw under controlled heat conditions to a narrow end diameter of 0.062 inch, or an end-to-end ratio of 4:1. Light traveling through the conduit in the fibers subtended by the apertures 80' and 90' (0.050 inch in diameter) result in virtual apertures or pupils 80'' and 90'' at the tip of the image conduit 70 which are 0.0125 inches in diameter. At the small end of the taper light travels horizontally through the fibers of the paper from pupil 80'' to fibers around the virtual aperture 90'' shown in FIG. 2(b). Though only the central core of the image conduit 70 is utilized for the light conduits, the remainder of the structure provides the necessary rigidity to withstand shock and vibration. The tolerance in forming the conduit is lessened by one degree in this construction, as is the dimensional tolerance of the apertures 80' and 90' due to the magnification involved.

Diagrams of the electric waveforms obtained with a probe according to the invention are shown in FIG. 3. Curve 104 in FIG. 3(a) is that obtained with a probe having virtual apertures 80'' and 90'' transversing a bar 111 as shown in FIG. 3(b). The curve 114 in FIG. 3(b) is the result of scanning two bars 111 and 112 spaced apart by approximately the diameter of the aperture circle as shown in FIG. 3(d).

As shown in FIG. 1, the tip of the conduit 70 is perpendicular to the longitudinal axis of the conduit 70 and the probe 10. This construction does not require any orientation where the envelope of the apertures is a circle of diameter substantially equal to the narrowest widths of the lines and spaces therebetween on the document to be scanned. The tip preferably is made quite small so that a small amount of cant is tolerated without losing resolution. FIG. 4 is a diagram comparing four different probe configurations as to efficacy and structure. In FIG. 4(a) the angle $\theta$ is exaggerated in the interest of clarity. But for elongated apertures and different ratio in sizes some care and a knowledge of the orientation of the apertures is often necessary when scanning a document by hand. If the facing of the tip is made at an angle $\alpha_b$ other than normal, as shown in FIG. 4(b), the probe may be held with the facing flat against the document and the probe led across the document with the smallest angle beneath it on the line of scan. In some applications this will be easy for the operator to do, but in others it will be difficult, especially where the diameter of the tip is rather small. The angle $\alpha_b$ must be small so that the distortion due to light entering the individual fibers is tolerable. An alternate method of placing the facing at an angle to the probe axis is shown in FIG. 4(c). Here an image conduit 70'' is curved in the last step of manufacture so that the face of the tip is normal to the fibers thereat but also lies at an angle $\theta_c$ other than normal to the longitudinal axis of the probe as desired. Here the orientation is readily observed by the configuration of the probe which makes it rather easy to scan with the proper attitude. FIG. 4(d) illustrates still another variant, wherein the conduit 70''' has two offset vertical axes. In the latter two forms of the probe, the tip protrudes some distance below the sleeve 26 but the same operation of the switch 40 is had as before.

Referring back to FIG. 3, it will be evident that a blot of ink on the document of substantial proportion with respect to the area of the apertures 80'' and 90'' may cause a false reading. This may be obviated with elongated apertures in the aperture plate 100' as shown in FIG. 5(a). An an equivalent structure is obtained with the aperture plate 100 of FIG. 2(a) also by flattening the tip in the final stage of the drawing process to a configuration as shown in FIG. 5(b). With proper drawing and flattening the optical fibers will be arranged to result in a pair of virtual apertures 80''', 90''' as shown in FIG. 5(b). An aperture of this shape will permit scanning blots and dirt spots roughly equal in diameter to the dimension of the tip in the direction of scan because the width of the tip (across the scan) is roughly three times as long. Electronic circuitry for differentiating between blots of this type and valid bars are well known.

While the invention has been shown and described particularly with reference to a preferred embodiment thereof, and various alternatives have been suggested, it should be understood that those skilled in the art may effect still further changes without departing from the spirit and scope of the invention as defined hereinafter.

The invention claimed is:

1. Manually operated optical scanning apparatus comprising a bundle of coherent light transmitting fibers having one end for contacting a document to be scanned and another end, a source of illumination directed toward said other end, a photosensitive device directed toward said other end, and at least one opaque member arranged at said other end and having contiguous apertures therein individual to said source of illumination and said photosensitive device for transmitting light from said source through one portion of said fibers to said one end for illuminating said document accordingly and reflecting light from and proportionally to indicia on said document to another portion of said fibers at said one end for transmission to said light sensitive device at said other end.

2. Manually operated optical scanning apparatus comprising a bundle of tapered coherent light transmitting fibers having one end for contacting a document to be scanned and a larger end, a source of illumination directed toward said larger end, a photosensitive device directed toward said larger end, and at least one opaque member having contiguous apertures therein individual to said source of illumination and said photosensitive device for transmitting light from said source through one portion of said fibers to said one end for illuminating said document accordingly and reflecting light from and proportionally to indicia on said document to another portion of said fibers at said one end for transmission to said light sensitive device.

3. Manually operated optical scanning apparatus as defined in claim 1 and wherein the transmitted light at said one end is translated substantially horizontally from said one portion to said other portion of said fibers.

4. Manually operated optical scanning apparatus as defined in claim 1 and said contiguous apertures are contiguous semicircular apertures.

5. Manually operated optical scanning apparatus as defined in claim 1 and wherein said contiguous apertures are elongated apertures contiguous along the longer dimensions.

6. Manually operated optical scanning apparatus as defined in claim 1 and wherein said one end is faced at an angle substantially differing from the perpendicular to the longitudinal axis of said bundle.

7. Manually operated optical scanning apparatus as defined in claim 1 and wherein said longitudinal axis of said bundle is curved to bring the facing of said one end at said angle.

8. Manually operated optical scanning apparatus as defined in claim 2 and wherein said one end is offset with respect to said larger end with the longitudinal axes thereof substantially parallel.

9. Manually operated optical scanning apparatus as defined in claim 1 and incorporating a tube in which said bundle and said opaque member with said apertures are mounted with concentric longitudinal axes.

10. Manually operated optical scanning apparatus as defined in claim 9 and wherein the tip of said bundle at said one end is bent with respect to the longitudinal axis of said barrel.

11. Manually operated optical scanning apparatus as defined in claim 9 and incorporating, a sleeve concentric with said tube and arranged for relative movement in the direction of the longitudinal axes thereof, an electric switch arranged within said tube and said sleeve for actuation in accordance with said relative movement as resulting from the act of pressing the tip of said bundle against the document to be scanned by urging said tube toward said document.

12. Manually operated optical scanning apparatus as defined in claim 2 and wherein said contiguous apertures are aligned in the direction of scan.

13. Manually operated optical scanning apparatus as defined in claim 2 and wherein said one end of said bundle has a cross-section at the tip thereof which is relatively long and narrow.

* * * * *